United States Patent
Zhu et al.

(10) Patent No.: US 11,687,363 B2
(45) Date of Patent: Jun. 27, 2023

(54) INTERNAL MANAGEMENT TRAFFIC REGULATION FOR MEMORY SUB-SYSTEMS

(71) Applicant: Micron Technology, Inc., Boise, ID (US)

(72) Inventors: Fangfang Zhu, San Jose, CA (US); Ying Yu Tai, Mountain View, CA (US); Ning Chen, San Jose, CA (US); Jiangli Zhu, San Jose, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 272 days.

(21) Appl. No.: 16/855,510

(22) Filed: Apr. 22, 2020

(65) Prior Publication Data

US 2021/0019181 A1   Jan. 21, 2021

Related U.S. Application Data

(60) Provisional application No. 62/874,349, filed on Jul. 15, 2019.

(51) Int. Cl.
| | |
|---|---|
| *G06F 9/48* | (2006.01) |
| *G06F 9/50* | (2006.01) |
| *G06F 9/54* | (2006.01) |
| *G06F 11/30* | (2006.01) |
| *G06F 11/34* | (2006.01) |

(Continued)

(52) U.S. Cl.
CPC .......... *G06F 9/4881* (2013.01); *G06F 3/0659* (2013.01); *G06F 5/06* (2013.01); *G06F 9/5016* (2013.01); *G06F 9/546* (2013.01); *G06F 11/3037* (2013.01); *G06F 11/3409* (2013.01); *G06F 11/3433* (2013.01); *G06F 13/1673* (2013.01); *G06F 13/1694* (2013.01); *G06F 2201/81* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 8,321,627 B1 * | 11/2012 | Norrie | G06F 13/161 |
| | | | 365/185.33 |
| 8,572,407 B1 * | 10/2013 | Chengottarasappan | ...................... |
| | | | G06F 9/5088 |
| | | | 726/4 |

(Continued)

*Primary Examiner* — Abu Zar Ghaffari
(74) *Attorney, Agent, or Firm* — Schwegman Lundberg & Woessner, P.A.

(57) ABSTRACT

In one embodiment, a processing device is coupled to memory components to monitor host read operations and host write operations from a host device coupled to the plurality of memory components. The processing device schedules, using a variable size internal command queue, a predetermined proportion of back-end processing device read and write operations as internal management traffic proportional to a number of the host read operations and a number of the host write operations. The processing device then executes a subset of the host read operations and the host write operations. Following execution of the subset of the host read operations and the host write operations, the processing device executes an internal management traffic operation based on the predetermined proportion.

15 Claims, 9 Drawing Sheets

(51) Int. Cl.
*G06F 13/16* (2006.01)
*G06F 5/06* (2006.01)
*G06F 3/06* (2006.01)

(56) References Cited

U.S. PATENT DOCUMENTS

| | | | | |
|---|---|---|---|---|
| 8,769,190 B1* | 7/2014 | Syu | ................ | G06F 3/064 |
| | | | | 711/173 |
| 10,446,215 B1* | 10/2019 | Hughes | ................ | G06F 3/0673 |
| 2004/0133707 A1* | 7/2004 | Yoshiya | ................ | G06F 3/0689 |
| | | | | 710/36 |
| 2006/0224826 A1* | 10/2006 | Arai | ................ | G06F 3/061 |
| | | | | 714/2 |
| 2009/0193108 A1* | 7/2009 | Shin | ................ | G06F 9/5011 |
| | | | | 709/223 |
| 2010/0058018 A1* | 3/2010 | Kund | ................ | G11C 13/0033 |
| | | | | 711/E12.001 |
| 2011/0093665 A1* | 4/2011 | Walker | ................ | G11C 8/12 |
| | | | | 711/E12.001 |
| 2013/0205103 A1* | 8/2013 | Engel | ................ | G06F 9/54 |
| | | | | 711/154 |
| 2013/0205149 A1* | 8/2013 | Chen | ................ | G06F 1/3225 |
| | | | | 713/322 |
| 2015/0127883 A1* | 5/2015 | Chen | ................ | G06F 3/0679 |
| | | | | 711/103 |
| 2016/0063090 A1* | 3/2016 | Plevyak | ................ | G06F 16/2379 |
| | | | | 707/740 |
| 2016/0070496 A1* | 3/2016 | Cohen | ................ | G06F 12/0246 |
| | | | | 711/103 |
| 2016/0291866 A1* | 10/2016 | Olcay | ................ | G06F 3/0679 |
| 2016/0364156 A1* | 12/2016 | Haustein | ................ | G06F 11/1458 |
| 2018/0032283 A1* | 2/2018 | Park | ................ | G06F 3/0619 |
| 2018/0364948 A1* | 12/2018 | Shan | ................ | G06F 3/061 |
| 2019/0187905 A1* | 6/2019 | Etuke | ................ | H04L 67/10 |
| 2019/0369917 A1* | 12/2019 | Jin | ................ | G06F 3/0604 |
| 2020/0065316 A1* | 2/2020 | Mizuno | ................ | H04L 41/0856 |
| 2020/0225856 A1* | 7/2020 | Eliash | ................ | G06F 11/1012 |

* cited by examiner

INTERNAL MANAGEMENT TRAFFIC REGULATION FOR MEMORY SUB-SYSTEMS

PRIORITY CLAIM

This application claims priority to U.S. Provisional Patent Application Ser. No. 62/874,349, filed Jul. 15, 2019, which is incorporated herein by reference in its entirety.

TECHNICAL FIELD

Embodiments of the disclosure relate generally to memory sub-systems, and more specifically, relate to regulation of internal management traffic for memory sub-systems.

BACKGROUND

A memory sub-system can be a storage device, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
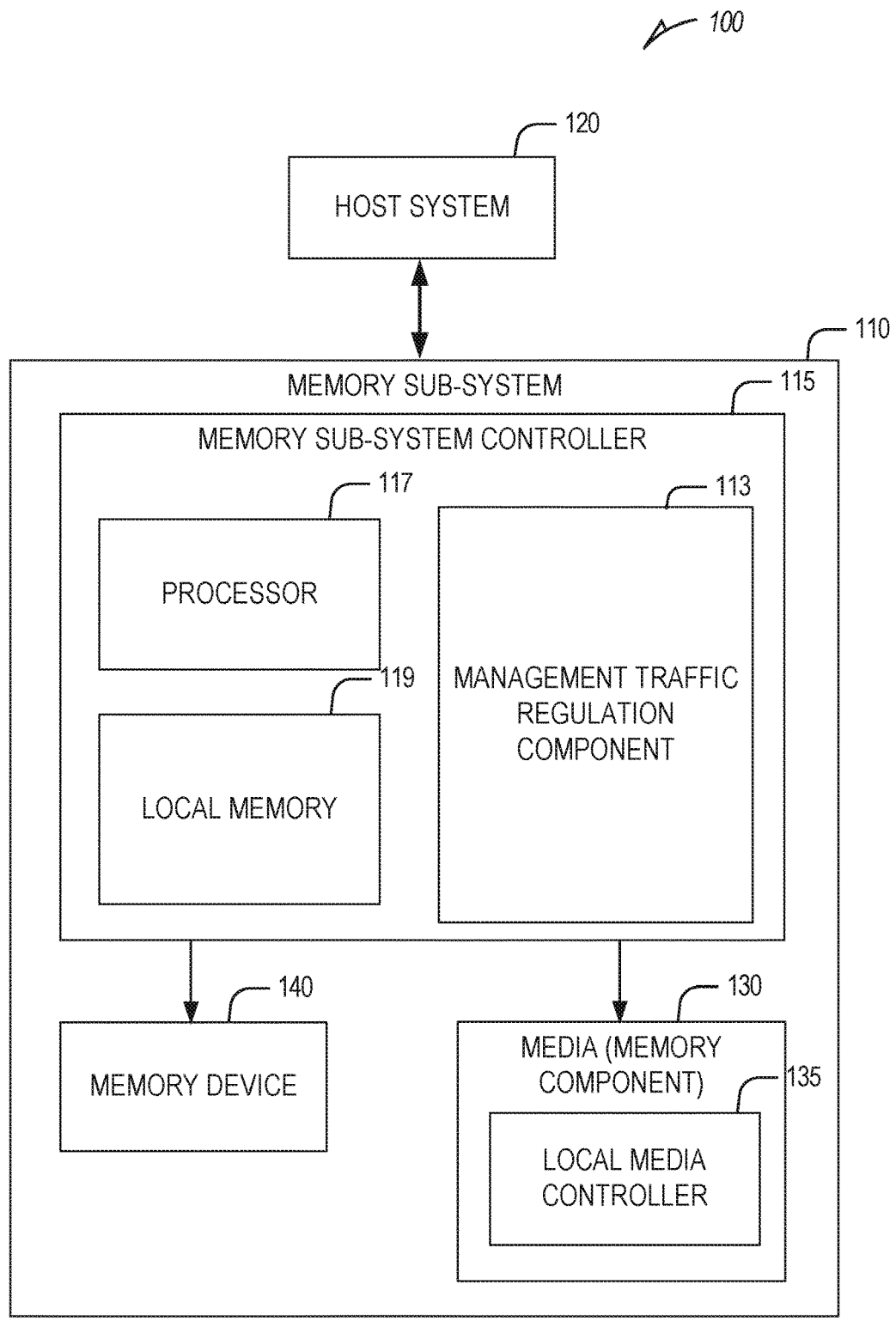
FIG. 1 illustrates an example computing system that includes a memory sub-system in accordance with some embodiments of the present disclosure.

Aspects of the present disclosure are directed to internal management traffic regulation for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The host system can send access requests to the memory sub-system, such as to store data at the memory sub-system and to read data from the memory sub-system. The data to be read and written are hereinafter referred to as "user data." A host request can include a logical address (e.g., a logical block address (LBA)) for the user data, which is the location the host system associates with the user data. The logical address (e.g., an LBA) can be part of metadata for the user data.

The memory devices can include non-volatile and volatile memory devices. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data.

The non-volatile memory devices can include, for example, three-dimensional cross-point ("3D cross-point") memory devices that are a cross-point array of non-volatile memory that can perform bit storage based on a change of bulk resistance, in conjunction with a stackable cross-gridded data access array.

Such non-volatile memory devices can group pages across dice and channels to form management units (MUs). A MU can include user data and corresponding metadata. A memory sub-system controller can send and receive user data and corresponding metadata as management units to and from memory devices. A super management unit (SMU) is a group of one or more MUs that are managed together. For example, a memory sub-system controller can perform media management operations (e.g., wear level operations, refresh operations, etc.) on SMUs.

A memory sub-system can perform internal management operations, such as media management operations (e.g., defect scanning, wear leveling, refresh), on the non-volatile memory devices to manage the memory devices. These internal management operations of a device can be managed by a controller of the memory sub-system, and used to perform media management operations, such as wear leveling operations, drift management operations, data refresh operations, data distribution operations, and other such internal maintenance operations. The memory sub-system can perform read and write operations as part of the media management operations, and may interfere with the read and write operations being performed for host requests. The interference can affect the performance (e.g., latency, throughput, etc.) of the memory sub-system. However, if media management operations are neglected, memory sub-system lifetime performance and data integrity can be compromised.

Aspects of the present disclosure address the above and other deficiencies by having a memory sub-system that includes a traffic management component that schedules the traffic of operations (e.g., operations for media management and operations for host requests) proportionally. Read and write operations that occur as part of the media management operations are hereinafter referred to as "media management-initiated operations" or "back-end operations." Read and write operations that occur to service a host request are hereinafter referred to as "host-initiated operations" or "front-end operations." The traffic management component can use a target ratio, a target set of M front-end operations for every back-end operation, or a similar target ratio in scheduling back-end traffic along with front-end traffic. Such scheduling can use a variable size internal command queue to schedule the back-end read and write operations (e.g., media management-initiated operations) between sets of front-end operations (e.g., host-initiated operations).

Some embodiments additionally use a load threshold (e.g., a performance threshold) to trigger use of the proportional scheduling of back-end operations, so that such systems are only in operation when the amount of front-end traffic is sufficient that it risks crowding out back-end operations.

These embodiments thus improve the operations of memory sub-systems in multiple ways. Such embodiments provide low complexity systems and methods for internal management traffic regulation while providing stable host service and ensuring minimum levels of internal management traffic. Such embodiments separate the dependency of internal management and front-end operations which use the same circuitry for read/write operations. Such embodiments are sufficiently flexible to be adapted quickly for different use cases which can operate with different front-end operation workloads which can benefit from different internal management ratios (e.g., different front-end/back-end proportions).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a secure digital (SD) card, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type flash memory (e.g., 2D NAND or 3D NAND) and 3D cross-point type memory are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Furthermore, the memory cells of the memory devices 130 can be grouped as memory pages or memory blocks that can refer to a unit of the memory component used to store data. Memory pages can be grouped across dice and channels to form management units (Mus).

A MU can include user data and corresponding metadata. A memory sub-system controller can send and receive user data and corresponding metadata as management units to and from memory devices. A super management unit (SMU) is a group of one or more Mus that are managed together. For example, a memory sub-system controller can perform media management operations (e.g., wear level operations, refresh operations, and the like) on SMUs.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), or any suitable combination thereof), or other suitable processor.

The memory sub-system controller 115 can include a processor 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., an LBA or namespace) and a physical address (e.g., a physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with the memory sub-system controller 115 to execute operations on one or more memory cells of the memory devices 130. An external controller (e.g., the memory sub-system controller 115) can externally manage the media device 130 (e.g., perform media management operations on the media device 130). In some embodiments, a memory device 130 is a managed memory device, which is a raw memory device combined with a local media controller (e.g., the local media controller 135) that performs memory management operations on the memory device 130 within the same memory device package. An example of a managed memory device is a managed NAND (MNAND) device.

The memory sub-system 110 includes a management traffic regulation component 113 (abbreviated as MT regulation component 113 in FIG. 1) that can track host related traffic (e.g., front-end read and writes), and schedule internal management traffic with as a predetermined proportion of the host traffic. In some embodiments, the memory sub-system controller 115 includes at least a portion of the management traffic regulation component 113. For example, the memory sub-system controller 115 can include a processor 117 (or other processing device) configured to execute instructions stored in local memory 119 for performing the operations described herein. In some embodiments, the management traffic regulation component 113 is part of the host system 110, an application, or an operating system.

The management traffic regulation component 113 can include an internal control queue to keep track of scheduled back-end operations, and initiate execution of the back-end operations between sets of front-end operations. In some embodiments, management traffic regulation component 113 can also compare the front-end traffic levels (e.g., the front-end load) with a threshold, so that the internal control queue can be ignored under certain conditions (e.g., when back-end traffic and front-end traffic together will not bottleneck host service.) Further details with regards to the operations of the management traffic regulation component 113 are described below.

Figure 2:
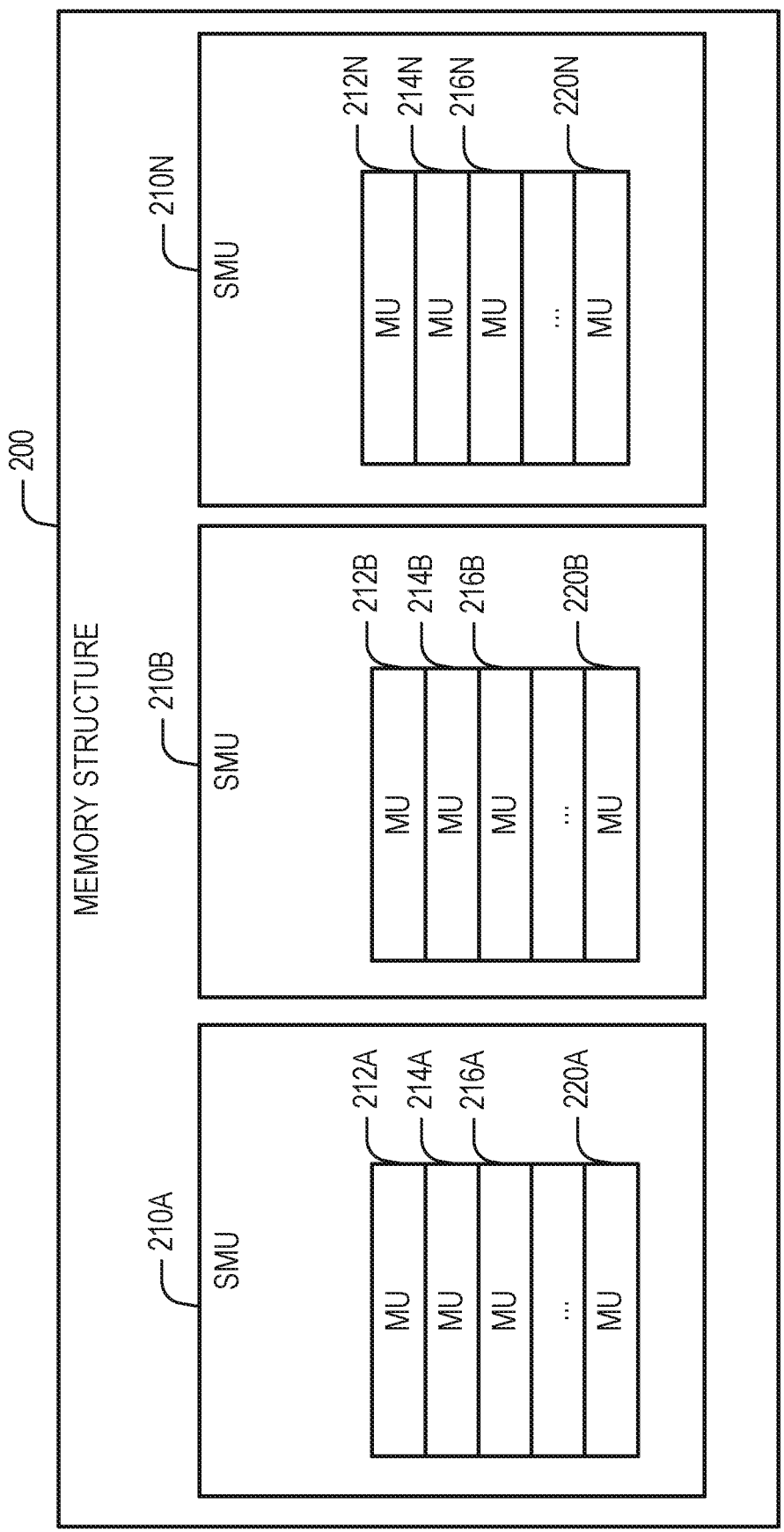
FIG. 2 illustrates aspects of an example memory sub-system in accordance with some embodiments of the present disclosure.

FIG. 2 illustrates aspects of an example memory structure of a memory sub-system in accordance with some embodiments of the present disclosure. As described herein, memory devices 130 can be configured with MU and SMU structures as illustrated by memory structure 200. In some embodiments, memory structure 200 is particularly cross-point memory as described above, with as a set of SMUs 210A through 210N.

Some non-volatile memory devices can group pages across dice and channels to form management units (Mus). A MU can include user data and corresponding metadata. A memory sub-system controller can send and receive user data and corresponding metadata as management units to and from memory devices. In some embodiments, Mus can be groups of dies, channels, pages, codewords, parity bits, memory cells, or a combination thereof. The Mus can enable a memory sub-system controller to manage (e.g., perform operations, procedures, and the like) on portions of the memory devices in allocated groups or sections of the media.

A super management unit (SMU) is a group of one or more Mus. The Mus in an SMU can be managed together. For example, a memory sub-system controller can perform initialization and media management operations (e.g., wear level operations, refresh operations, etc.) on SMUs.

Each SMU includes a corresponding set of Mus 212 through 220. For example, as shown, SMU 210A includes Mus 212A through 220A, and SMU 210N includes Mus 212N through 220N. In one example embodiment, a memory structure 200 system can have 100,000 SMUs, with each SMU containing 1000 Mus. Other embodiments of such coarse mapped storage 200 can have different numbers of SMUs and Mus, with the balance of SMUs and Mus configured for efficient management of data storage.

Mus are one example of a data unit. For example, a data management unit can be a page (e.g., smallest unit of data that can be written to or read) of a cross-point array of non-volatile memory or a data block (e.g., smallest unit of data that can be erased) of flash-based memory.

One technique of managing the endurance in a memory sub-system is wear leveling. The storing of data at a memory device can increase the wear of the memory device. After a threshold amount of write operations, the wear can cause the memory device to become unreliable so that data can no longer be reliably stored and retrieved from the memory device. At such a point, the memory sub-system can result in a failure when any of the memory devices fails.

Wear leveling is a process that helps reduce premature wear in memory devices by distributing write operations across the memory devices. Wear leveling includes a set of operations to determine which physical media (e.g., set of memory cells) to use each time data is programmed to help ensure that certain physical sets of memory cells are not written and erased more often than others.

A wear leveling operation can attempt to evenly distribute the read, write and erase operations, and thus the corresponding physical wear, across the memory components. The memory cells of the memory devices can be organized into some number of individual units. For example, 3D cross-point memory devices can organize pages into Mus, and MU can be grouped into SMUs. In another example, NAND memory devices a group of pages forms a block. Individual units can represent individual segments of a memory device that can be written or erased in a single operation. A management unit (MU) is used as one example of a unit hereinafter.

Indicators of wear on the Mus of the memory sub-system can be measured, for example, as total write counts (e.g., the number of times a write operation that writes user data to a MU is performed on the MU during the lifetime of the MU), total read counts (e.g., the number of times a read operation that reads user data from a MU is performed on the MU during the lifetime of the MU), or total erase counts (e.g., the number of times an erase operation that erases data from a MU is performed on the MU during the lifetime of the MU), or a combination of such. Wear leveling techniques can include a sorting process to find Mus with high total read or total write counts and Mus with low total read count or total write counts. The data (e.g., user data and/or metadata) from a MU having a high total read or total write count can be swapped with the data (e.g., user data and/or metadata) of a MU having a low total read or total write count in an attempt to evenly distribute the wear across the Mus of the memory sub-system.

The memory sub-system can perform media management operations, such as refresh operations, to prevent stored data (e.g., user data and/or metadata) that is stale (e.g., not accessed for a threshold amount of time) from degrading and becoming corrupted. As data is stored over time, various device characteristic cause the probability of data errors to increase over time following a write of the data to the memory device. To prevent data errors, internal management traffic can be used to periodically perform refresh operations. A refresh operation includes writing data (e.g., user data and/or metadata) to another location (e.g., another MU) in the memory device, essentially resetting the time over which the data is expected to degrade. If not scheduled appropriately, such back-end read and write operations for the refresh operations can interfere with host-initiated operations that are responding to read and write operations for requests received from a host system. As described above, embodiments herein improve the operation of such memory sub-systems with improved systems and methods for internal management traffic regulation that providing stable host service while ensuring minimum levels of internal management traffic. Such embodiments separate the dependency of internal management and front-end operations which use the same circuitry for read/write operations, and provide improved flexibility to be adapted quickly for different use cases which can operate with different front-end workloads which can benefit from different internal management ratios (e.g., different front-end/back-end proportions).

Figure 3:
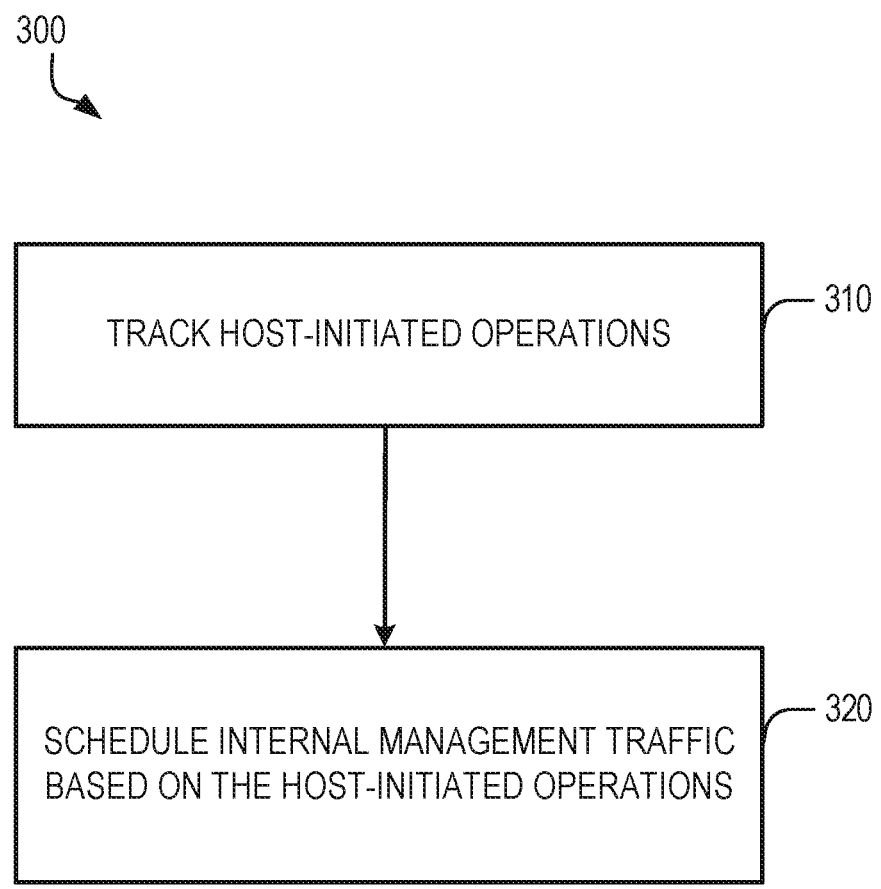
FIG. 3 is a flow diagram of an example method to regulate internal management traffic in memory devices in accordance with some embodiments of the present disclosure.

FIG. 3 is a flow diagram of an example method 300 to regulate internal management traffic in memory sub-systems, in accordance with some embodiments of the present disclosure. The method 300 can be performed by processing logic that can include hardware (e.g., processing device, circuitry, dedicated logic, programmable logic, microcode, hardware of a device, integrated circuit, or any suitable combination thereof), software (e.g., instructions run or executed on a processing device), or a combination thereof. In some embodiments, the method 300 is performed by the management traffic regulation component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In operation 310, the processing device tracks a number of pending host-initiated operations (e.g., host-initiated read operations host-initiated write operations, or a combination of such) for memory components managed by the processing device. The processing device can track values (e.g., a count) of the front-end operations currently awaiting service. In other embodiments, the processing device can monitor additional information pertaining to the pending host-initiated operations relevant to the actual operation workload on the memory sub-system, and the potential for the host-initiated operations combined with back-end internal management operations to impact host service by the memory sub-system. In various embodiments, any suitable system structure and associated processes (e.g., firmware monitoring) can be used to track host-initiated operations, such reads and writes, or a combination of such, in operation 310.

The processing device, in operation 320, schedules internal traffic management (e.g., back-end traffic) based on the host-initiated operations. The scheduling is configured such that the internal management traffic is set to be a target proportion of the total number of operations. The total number of operations can include host-initiated operations, media management-initiated operations, or a combination thereof. The operations can include read operations, write operations, or a combination thereof. For example, one out of every 20 read or write operations can be scheduled as an internal management operation, or X host operations can be scheduled followed by Y internal management operations, where X and Y are values for a ratio between front-end and back-end operations that can be adjusted based on the particular configuration of the memory sub-system. For example, the memory sub-system can have an operational workload depending on whether the memory sub-system is coupled to desktop computer, laptop computer, network server, mobile device, embedded computing device, automotive application specific computing devices, surveillance application specific computing devices, and other such devices which use a memory sub-system can each have different targeted proportions for front-end and back-end operations.

Figure 4:
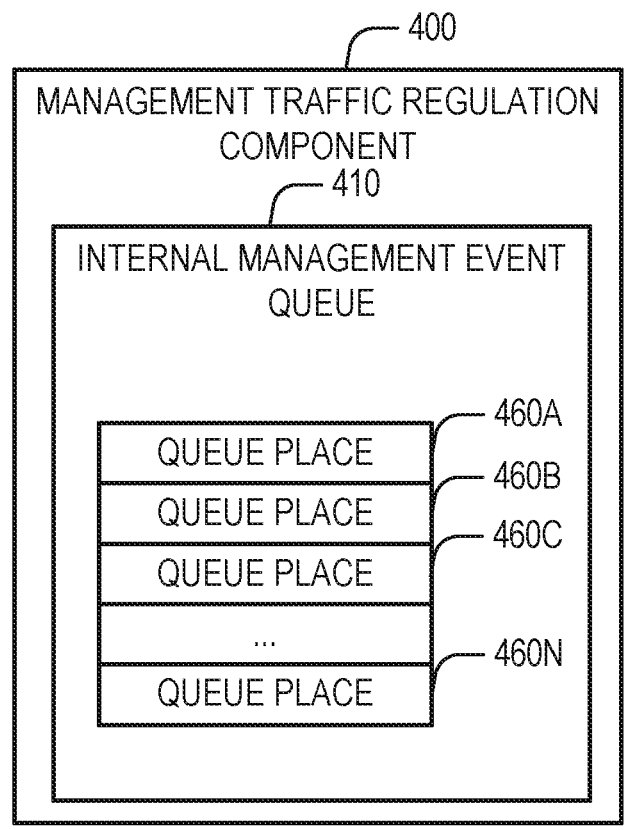
FIG. 4 illustrates aspects of an example memory sub-system in accordance with some embodiments of the present disclosure.

The scheduling of the internal traffic uses an internal management event queue. The internal management event queue can be a variable structure implemented in memory available to the processing device, that can be allocated and deallocated as needed. In various embodiments, a suitable structure for storing scheduling information for internal traffic can be used. FIG. 4 illustrates an example of an internal management event queue that can be used in accordance with some embodiments. In other embodiments, any other such structures can be used.

In some embodiments, the processing device schedules one internal management traffic operation for every twenty pending host operations.

FIG. 4 illustrates aspects of an example memory sub-system in accordance with some embodiments of the present disclosure, and particularly describes one embodiments of an internal management event queue 410 as part of management traffic regulation component 400, which can be management traffic regulation component 113 in some embodiments.

Internal management event queue 410 includes queue places 460A-460N. The specific number of places (e.g., separate data storage structures for storing the data relevant to scheduling a particular internal management operation) can vary depending on a number of factors. In some embodiments, the number of queue places 460A-460N is adjusted as additional internal management operations are added to internal management event queue 410 prior to previous operations being executed. Such queue places can be added individually or in groups. For example, the initial scheduling of the first internal management operation can cause a first set of queue places 460A, 460B, and 460C to be created. If the number of operations scheduled in event queue 410 increases, the number of queue places can be increased. In some embodiments, a maximum number of queue places can be set, to prevent overflow of a backlog of internal management operations from impacting host services. In such embodiments, additional internal management operations that would result in the internal management event queue 410 exceeding a maximum size can be rejected and the system refrains from adding the additional internal management operations. Subsequent back-end operations may be re-prioritized to reduce the incoming back-end operations to a rate at or below the proportion of the system resources set for back-end operations. As described above, this proportion is flexible, and can be set to accommodate the particular balance of back-end and front-end resources needed for a specific deployment. In some embodiments, the variable size internal command queue has between one and twenty queue places, with larger queue sizes blocked to prevent performance impacts of a larger queue. In other embodiments, any queue size can be used based on the particular deployment and back-end traffic to be managed. In some embodiments, the number of queue places in the variable size internal command queue is adjusted based on a set of pending internal management operations.

Figure 5:
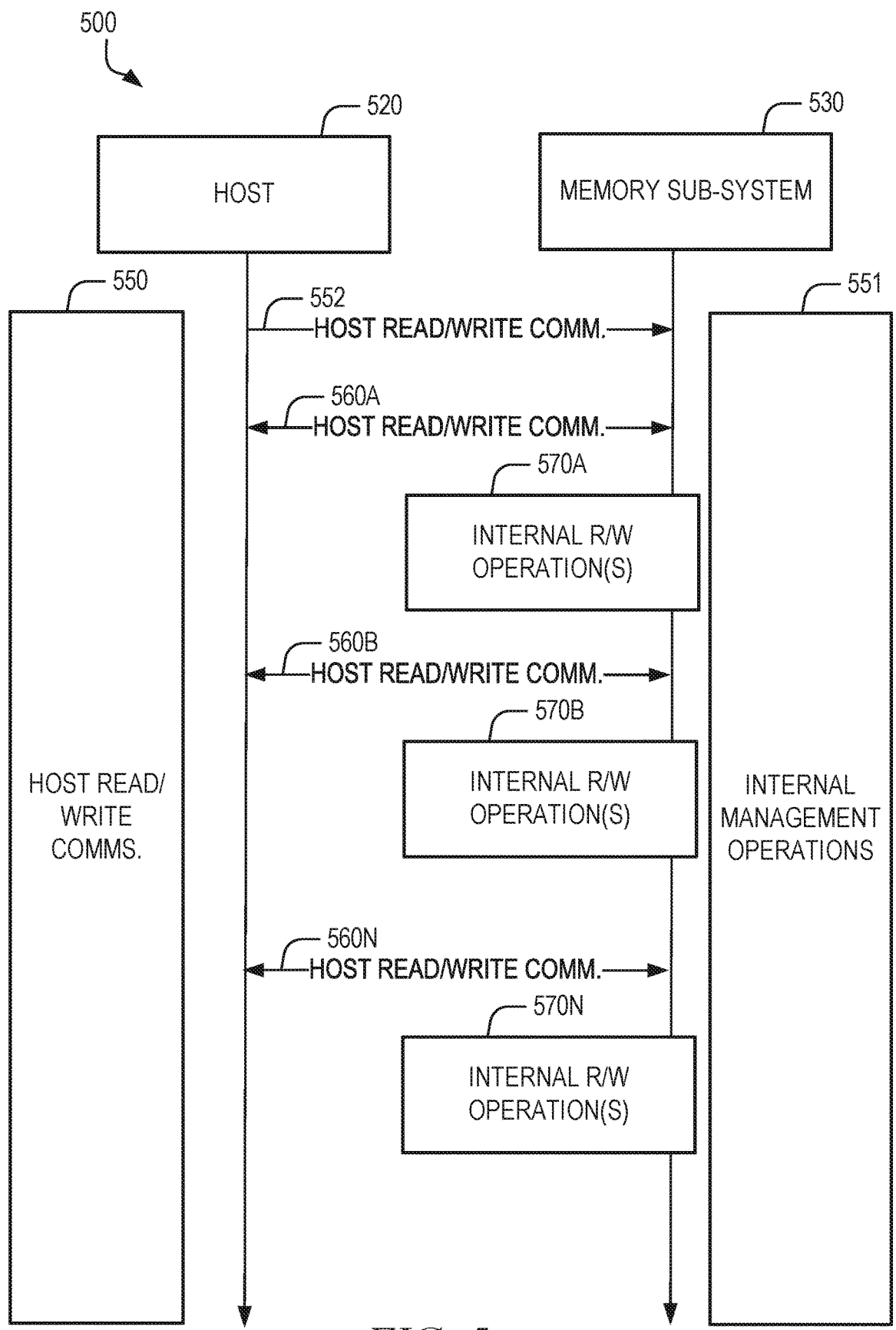
FIG. 5 is a communication chart illustrating aspects of systems to regulate internal management traffic in memory devices in accordance with some embodiments of the present disclosure.

FIG. 5 is an example of communications 500 illustrating aspects of systems to regulate internal management traffic in memory sub-systems in accordance with some embodiments of the present disclosure. FIG. 5 includes a host 520 and a memory sub-system 530. The host 520 can be the host system 120. The memory sub-system 530 can be any circuitry, controller, or combinations of multiple processors or controllers used to implement a management traffic regulation component 113 as described in FIGS. 1 and 9.

As illustrated, the host 520 engages in host read/write communications 550 with the memory sub-system 530. The host read/write communications 550 are responsive to applications or various instructions operating on the host 520 in order to store and read data using the memory sub-system 530 and memory components that are integrated with the memory sub-system 530. Host read/write communications 552, 560A, 560B, and 560N are examples of host read/write communications 550.

The memory sub-system 530 monitors the host read write communications 550, and schedules internal management operations 551 based on the load placed on the memory sub-system resources by the host read/write communications 550. Internal read/write operations 570A, 570B, and 570N are examples of internal management operations 551.

When a particular read/write command, such as the host read/write communication 552, is sent from the host 520 and processed by the memory sub-system 530, the memory sub-system 530 performs operations to serve a response to the command within host service parameters as part of host read/write communications 560A. These operations can occur repeatedly in host read/write communications 560A-560N.

The memory sub-system 530 can balance any internal operational demand against the host 520 demands. Since host read/write communications 560A-560N use some of the same shared resources as internal read/write operations 570A-570N, the memory sub-system 530 is configured to balance the ratio of use by each in accordance with the predetermined proportion set within the memory sub-system 530. For each of host read/write communications 560, the memory sub-system can perform a set of read and/or write operations in accordance with the proportion, and can perform the intervening internal read/write operation(s) 570 based on a selected proportion of the shared resources used for read and/or write operations.

Figure 6:
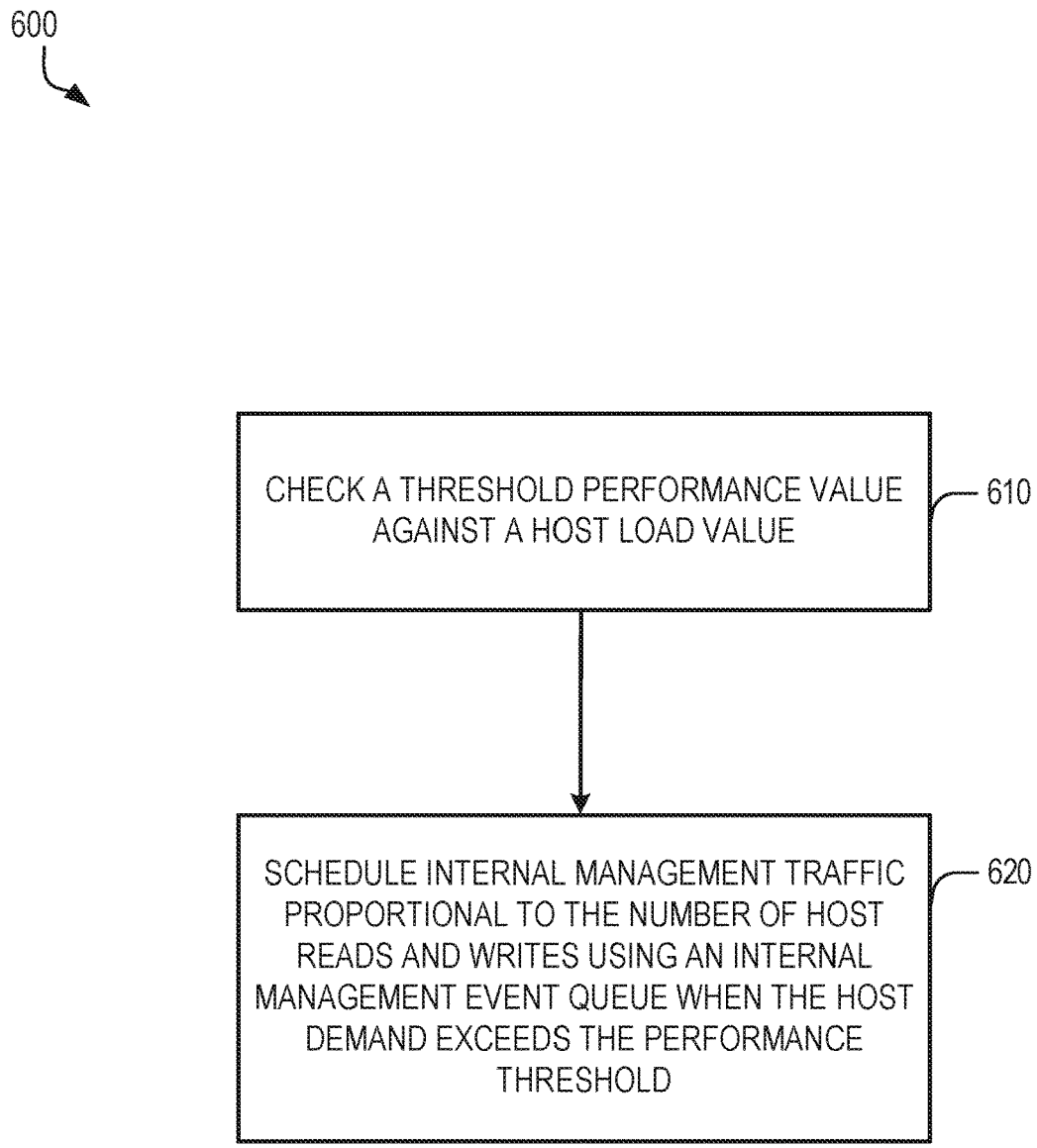
FIG. 6 is a flow diagram of an example method to regulate internal management traffic in memory devices in accordance with some embodiments of the present disclosure.

FIG. 6 is a flow diagram of an example method to regulate internal management traffic in memory sub-systems in accordance with some embodiments of the present disclosure. The method 600 can be performed by processing logic that can include hardware (e.g., processing device, circuitry, dedicated logic, programmable logic, microcode, hardware of a device, integrated circuit, or any suitable combination thereof), software (e.g., instructions run or executed on a processing device), or a combination thereof. In some embodiments, the method 600 is performed by the management traffic regulation component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

As described above, some embodiments can use a front-end load threshold to trigger use of proportional scheduling of front-end and back-end operations based on the threshold.

In operation 610, the management traffic regulation component 113 checks a threshold performance value against a host load value. As described above, the threshold can be configured in different embodiments so that the expected internal management traffic for the particular deployment combined with the host load value will only impact host service when the host load value is above the performance threshold. For example, if the processing device is capable of serving a total of 1.8 gigabits per second (GB/s) of read and/or write operations to and from MUs of the memory sub-system, and internal traffic is expected to be a maximum of 0.2 GB/s, the performance threshold can be set to 1.5 GB/s, with a ratio of one internal operation for every 8 host operations. In other embodiments, the performance threshold can be expressed as a number of currently scheduled operations, or any other such representation of the load placed on the memory sub-system by host commands.

The management traffic regulation component 113, in operation 620, schedules the internal management traffic proportional to the number of host read and/or writes using the internal command queue when the host demand (e.g., front-end traffic) satisfies a performance criterion (e.g., exceeds the performance threshold value). If the performance criterion is not satisfied (e.g., the threshold value is not exceeded), the management traffic regulation component 113 can schedule internal management traffic in real-time, or near real-time, or via any standard process without using the internal command queue.

Figure 7:
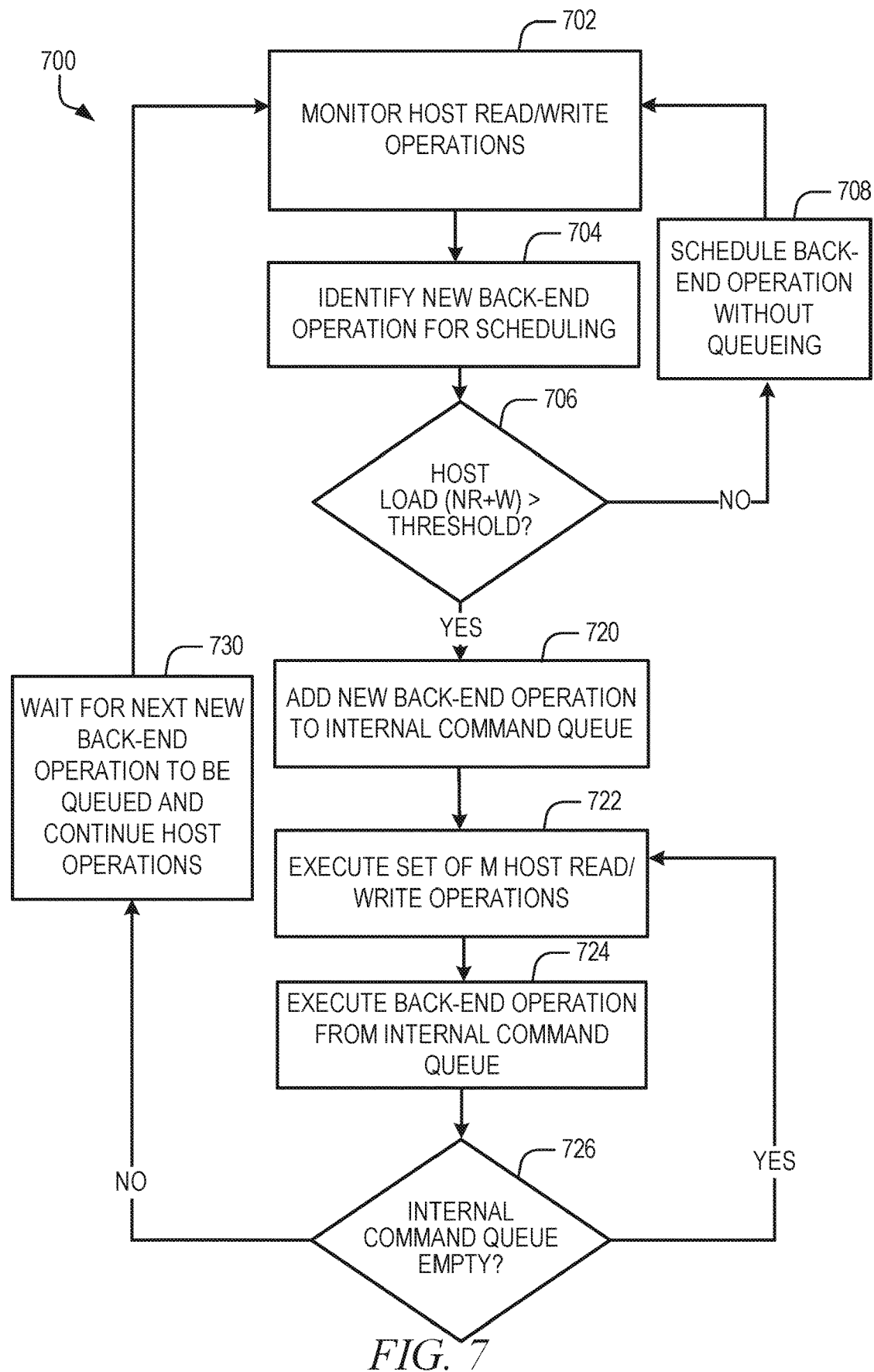
FIG. 7 is a flow diagram of an example method to regulate internal management traffic in memory devices in accordance with some embodiments of the present disclosure.

FIG. 7 is a flow diagram of an example method to regulate internal management traffic in memory sub-systems in accordance with some embodiments of the present disclosure. The method 700 can be performed by processing logic that can include hardware (e.g., processing device, circuitry, dedicated logic, programmable logic, microcode, hardware of a device, integrated circuit, or any suitable combination thereof), software (e.g., instructions run or executed on a processing device), or a combination thereof. In some embodiments, the method 700 is performed by the management traffic regulation component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In operation 702, the management traffic regulation component 113 monitors host read and/or write operations. In various embodiments, this can involve determining a number of operations for MU read and writes, or any other such characteristics of the host demands on the memory sub-system including the processing device. In the embodiment of method 700, the processing device specifically tracks a number of read operations (e.g., a value of the number of pending reads of MUs or SMUs and pending writes to MUs or SMUs).

The management traffic regulation component 113, in operation 704, identifies a new back-end operation for scheduling. Thereafter, as shown in operation 706, the management traffic regulation component 113 checks the host load against the performance threshold to determine whether to schedule the new back-end operation proportionately with front-end traffic. In the particular embodiment of method 700, this check is configured with a front-end load value determined according to:

$$nR+W>\text{Threshold} \qquad 1$$

where threshold is the performance threshold, R is the number of pending host read operations, W is the number of pending host write operations, and n is a scaling factor. Use of such a check allows the internal management operations to be performed more quickly and with less overhead when an impact to the host service is minimal. This can, in some instances, allow completion of internal management operations when host demand is low, so that fewer internal management operations are pending when host demand is higher.

Additionally, while some embodiments operate with a scaling factor of 1 so that read and write operations are considered equally in terms of the front-end load value, in some embodiments, the scaling factor is less than one. In some memory sub-system deployments, wear leveling operations may make up a majority of the internal management traffic. Since the amount internal management traffic for wear-leveling can be, in some systems, strongly related to front-end write traffic, in some embodiments, the amount of expected internal management traffic is expected to increase when front-end write operations increase. Therefore, using a scaling factor less than 1 generates a front-end load value that is adapted to the expected match between front-end write operations and back-end management traffic. Some embodiments use a scaling factor of 0.1. In other systems, the scaling factor can be a variable that is set based on a particular deployment. In some such systems, the scaling factor can be adjusted to be equal to 0.1, 1, or any value between 0.1 and 1. In still other embodiments, the scaling factor can be adjusted to be any value.

In operation 708, if the host load value from operation 706 is below the performance threshold value (or equal to, in some embodiments), the processing device schedules the new back-end operation without proportional queueing. The procedure then continues from operation 702. If the host load value from operation 706 is above the performance threshold value (or equal to, depending on the particular embodiment), the new back-end operation is added to the internal command queue in operation 720. Such a command queue can be a variable internal command queue, as described above in FIG. 4 as internal management event queue 410. In other embodiments, the command queue can be replaced with any mechanism for proportional scheduling of front- and back-end traffic.

The management traffic regulation component 113, in operation 722, executes a set of M host read/write operations. In operation 724, the processing device executes a back-end operation from the internal command queue. If the new back-end operation identified in operation 704 is the only operation in the internal command queue, it will be executed in operation 724. If other back-end operations are in the internal command queue, another back-end operation can be executed, depending on the configuration of the particular system. Operations 722 and 724 are one implementation for proportional scheduling of front and back-end traffic, set at a ratio of M:1 front-end to back-end traffic. Other embodiments can implement proportional traffic using other mechanisms. For example, as described above, more than one operation can be executed at a time during the back-end functions of operation 724 in some embodiments, or other characteristics of the scheduled traffic, such as MU or SMU operations can be used as the measurement metric.

After a back-end operation is executed in operation 724, the management traffic regulation component 113 checks, in operation 726, to see if any remaining back-end operations remain scheduled in the internal command queue. If yes, the processor continues executing the front-end and back-end traffic according to the configured proportions, repeating operations 722, 724, and 726. If no, then in operation 730, the management traffic regulation component 113 continues with host operations uninterrupted by back-end operations, until another back-end operation is identified in operation 704.

As described above, some embodiments operate by determining that a number of pending host operations consisting of the number of pending host read operations and the number of pending host write operations is above a threshold performance value. In such embodiments, scheduling a number of internal management traffic operations proportional to the number of pending host read operations and the number of pending host write operations is initiated in response to the determination that the number of pending host operations is above the threshold performance value.

The method 700 may be executed continuously by the management traffic regulation component 113. Thus, at a first time, a first host load is found to be below the threshold in operation 706 and, at a second time, a second host load is found to exceed the threshold during a later iteration of operation 706. Accordingly, during one iteration of the method 700, a back-end operation is scheduled without queueing in operation 708 and, during another iteration on the same device, operations 720-730 are performed, queuing the back-end operation and limiting back-end operation executions to the predetermined proportion, M.

Figure 8:
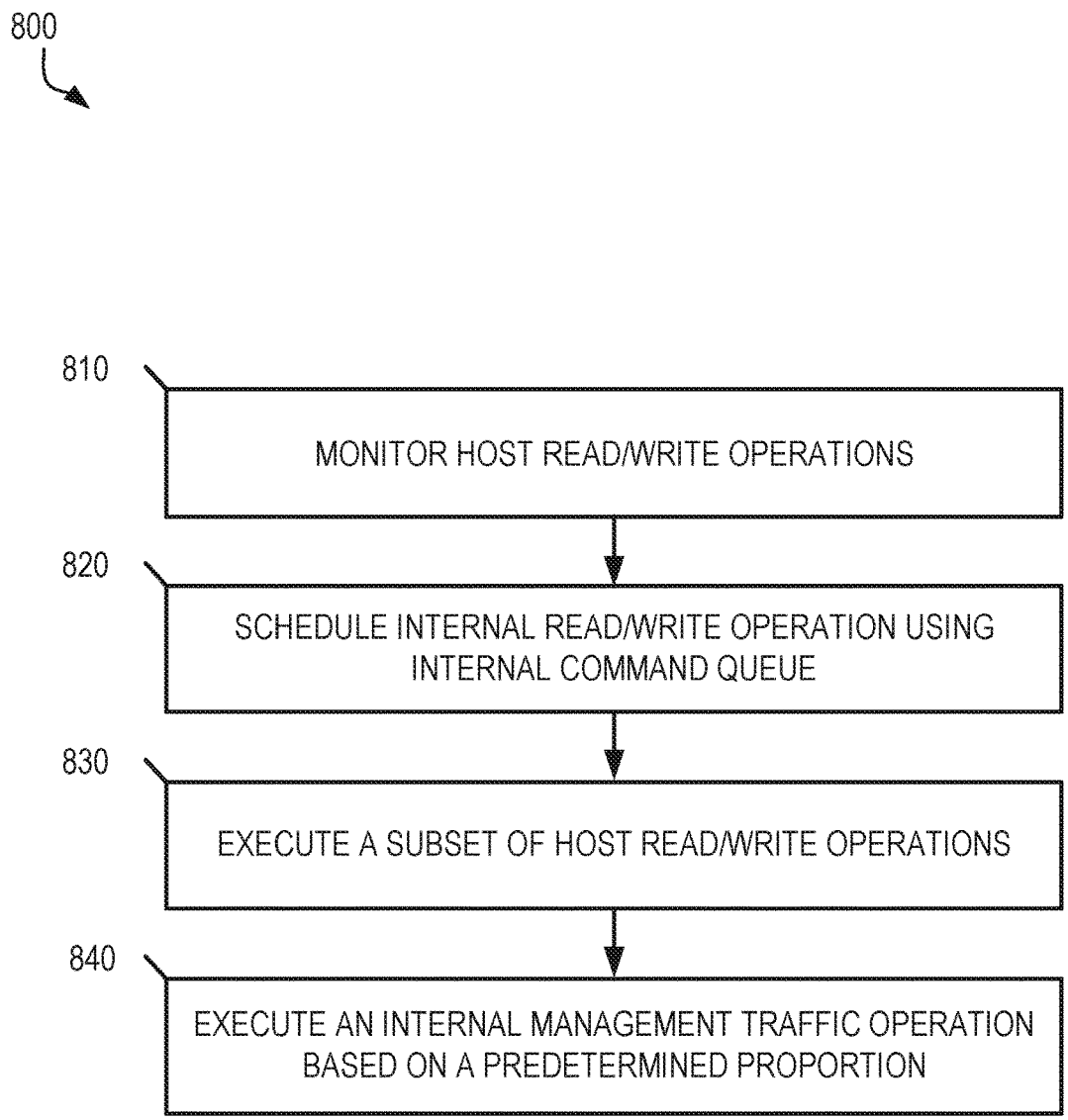
FIG. 8 is a flow diagram of an example method to regulate internal management traffic in memory devices in accordance with some embodiments of the present disclosure.

FIG. 8 is a flow diagram of an example method to regulate internal management traffic in memory sub-systems in accordance with some embodiments of the present disclosure. The method 800 can be performed by processing logic that can include hardware (e.g., processing device, circuitry, dedicated logic, programmable logic, microcode, hardware of a device, integrated circuit, or any suitable combination thereof), software (e.g., instructions run or executed on a processing device), or a combination thereof. In some embodiments, the method 800 is performed by the management traffic regulation component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In operation 810, the management traffic regulation component 113 monitors host-initiated read operations and host-initiated write operations from a host device coupled to memory components such as memory device 130. The management traffic regulation component 113, in operation 820, schedules a predetermined proportion of back-end processing device read and write operations as internal management traffic proportional to a number of the host read operations and a number of the host write operations. This is done using a variable size internal command queue. The management traffic regulation component 113 executes a subset of the host read operations and the host write operations in operation 830. Following execution of the subset of the host read operations and the host write operations, as shown in operation 840, the management traffic regulation component 113 executes an internal management traffic operation based on the predetermined proportion. In some embodiments, the internal traffic management includes a set of wear leveling read/write operations. In some embodiments, the internal traffic management includes a set of data refresh operations.

As described above for FIG. 7, some such embodiments can operate with the processing device configured to monitor a front end load value determined according to nR+W, and then initiate internal management traffic operations immediately (or using a faster process) without using the variable size internal command queue when the front end load value is less than or equal to a threshold performance value. In some such embodiments, using the variable size internal command queue of the predetermined proportion of back-end processing device read and write operations as the internal management traffic proportional to the number of the host read operations and the number of the host write operations is performed by the processing device in response to determining that the front end load value is greater than the threshold performance value.

Some such embodiments operate with a scaling value is equal to or between 0.1 and 1. Other embodiments use a predetermined proportion of one back-end operation per at least every M front-end operations, wherein the front-end operations include the host read operations and the host write operations. In some embodiments M has a value between 10 and 40. In some embodiments, a number of queue places in the variable size internal command queue is adjusted based on a set of pending internal management operations.

Figure 9:
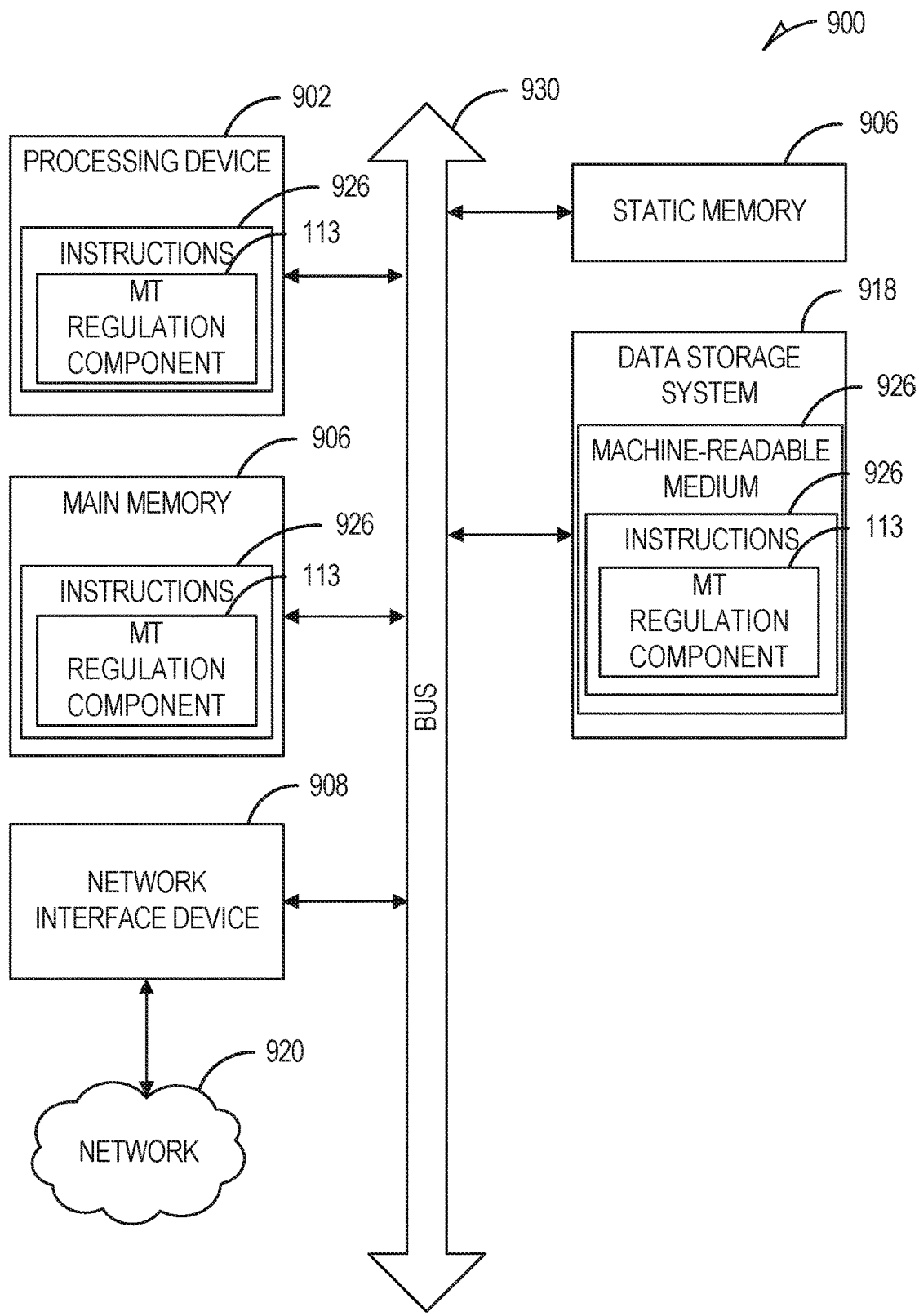
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the management traffic regulation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a management traffic regulation component (e.g., the management traffic regulation component 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system, comprising:
    a memory device; and
    a memory sub-system controller, operatively coupled with the memory device, and configured to perform operations comprising:
        determining a host load at a first time as a weighted sum of a number of read operations received from a host and a number of write operations received from the host by applying a lower weight to the number of read operations received from the host than to the number of write operations received from the host;
        based on the host load and a predetermined threshold, scheduling an internal management operation of the memory device without adding the first internal management operation to an internal command queue;
        monitoring operations received from the host to determine a second host load at a second time;
        based on the second host load and the predetermined load threshold, adding a second internal management operation to the internal command queue;
        based on a size of the internal command queue and a second predetermined threshold, refraining from adding a third internal management operation to the internal command queue; and
        executing the second internal management operation from the internal command queue based on a predetermined ration between internal management operations and operations received from the host being 40.

2. The memory system of claim 1, wherein the internal command queue has a variable size.

3. The memory system of claim 1, wherein the lower weight applied to the number of read operations received from the host is one-tenth of the weight applied to the number of write operations received from the host.

4. The memory system of claim 1, wherein the first internal management operation is a refresh operation.

5. The memory system of claim 1, wherein the operations further comprise:
    monitoring operations received from the host a third host load at a third time.

6. A method comprising:
    determining, by one or more processors of a memory sub-system controller, a first host load at a first time as a weighted sum of a number of read operations received from a host by a memory device and a number of write operations received from the host by the memory device by applying a lower weight to the number of read operations received from the host than to the number of write operations received from the host;
    based on the first host load and predetermined load threshold, scheduling, but the one or more processors, a first internal management operation of the memory device without adding the first internal management operation to an internal command queue;
    determining a second host load by monitoring operations received from the host by the memory device at a second time;
    based on the second host load and the predetermined load threshold, adding a second internal management operation to the internal command queue;
    based on a size of the internal command queue and a second predetermined threshold, refraining from adding a third internal management operation to the internal command queue; and
    executing the second internal management operation from the internal command queue based on a predetermined ration between internal management operations and operations received from the host being 40.

7. The method of claim 6, wherein the lower weight applied to the number of read operations received from the host is one-tenth of the weight applied to the number of write operations received from the host.

8. The method of claim 6, wherein the first internal management operation is a refresh operation.

9. The method of claim 6, wherein the method further comprises:
    monitoring, at a third time, operations received from the host to determine a third host load.

10. The method of claim 6, wherein the internal command queue has a variable size.

11. A memory sub-system controller configured to perform operations comprising:
    determining a first host load at a first time as a weighted sum of a number of read operations received from a host by a memory device and a number of write operations received from the host by the memory device by applying a lower weight to the number of read operations received from the host than to the number of write operations received from the host;
    based on the host load and a predetermined threshold, scheduling a first internal management operation of the memory device without adding the first internal management operation to an internal command queue;
    monitoring, at a second time, operations received from the host to determine a second host load;
    based on the second host load and the predetermined load threshold, adding a second internal management operation to the internal command queue;
    based on a size of the internal command queue and a second predetermined threshold, refraining from adding a third internal management operation to the internal command queue; and
    executing the second internal management operation from the internal command queue based on a predetermined ratio between internal management operations and operations received from the host being 40.

12. The memory sub-system controller of claim 11, wherein the lower weight applied to the sum of read operations received from the host is one-tenth of the weight applied to the number of write operations received from the host.

13. The memory sub-system controller of claim 11, wherein the operations further comprise:
 monitoring operations received from the host to determine a third host load at a third time.

14. The memory sub-system controller of claim 11, wherein the internal command queue has a variable size.

15. The memory sub-system controller of claim 11, wherein the first internal management operation is a refresh operation.

\* \* \* \* \*